Dec. 15, 1925.

F. A. LITTER 1,565,859

PISTON AND PISTON RING

Filed Dec. 4, 1922

Frederick A. Litter INVENTOR.

BY

ATTORNEY.

Patented Dec. 15, 1925.

1,565,859

UNITED STATES PATENT OFFICE.

FREDERICK A. LITTER, OF COLUMBUS, OHIO, ASSIGNOR, BY MESNE ASSIGNMENTS, TO THE LITTER PISTON MFG. COMPANY, OF CHARLESTON, WEST VIRGINIA, A CORPORATION OF WEST VIRGINIA.

PISTON AND PISTON RING.

Application filed December 4, 1922. Serial No. 604,671.

*To all whom it may concern:*

Be it known that I, FREDERICK A. LITTER, a citizen of the United States of America, residing at Columbus, in the county of Franklin and State of Ohio, have invented certain new and useful Improvements in Pistons and Piston Rings, of which the following is a specification.

My invention relates to pistons and piston rings and has to do particularly with a structure for resiliently suporting the rings and, at the same time, preventing the passage of any fluid past the rings.

In the past, various methods and means have been used for expanding the rings in a piston ring groove. Some of these methods have involved the introduction of expanding means in the same groove with the piston; some have contemplated the use of rings of inherently expansible material. These rings, whether used with or without expanding means, have frequently varied in size and shape. These efforts toward the production of a uniformly tight packing have been numerous and quite varied, but satisfactory results have not been obtained. Such efforts have apparently failed because, for one reason, they have failed to prevent the passage of oil and other fluids beneath the rings. In other words, the attempts have generally been directed primarily towards the expanding of the rings with considerable pressure against the cylinder walls, but the sealing of the space beneath the ring and the necessity for providing a structure that will insure this has been neglected.

My invention contemplates the provision of means for expanding the rings uniformly against the cylinder walls to form a positive sealing with very little friction, and which means are of such construction and are so disposed in the ring groove that part of the groove will still be of standard commercial cross-section. Furthermore, by my device, the rings are relatively locked in the ring groove whereby the joint of one ring may be oppositely disposed from the joint of the adjacent ring. Moreover, my invention is such that the oil and other fluids are not only prevented from passing transversely beneath the rings but are substantially prevented from passing circumferentially beneath the rings.

More specifically, I have found, especially when expanding means are utilized, that a great amount of leakage takes place beneath the rings and the bottom of the groove and, particularly, at the joints of the rings and at the points where the expanding force is applied. Therefore, I have provided sockets suitably positioned around said groove and provided with expanding means of such structure that a positive and uniform contact will exist between the rings and the cylinder wall and between the sides of the rings and the sides of the groove at all times. Furthermore, I have provided rings which, for part of their length, are chamfered at their inner edges to receive the expanding means and which are also in some parts of rectangular cross-section. This rectangular section of the rings may be so arranged relative to the expanding means as to insure locking of the rings from turning and to substantially prevent the passage of any fluid at the joints or beneath the rings.

Many other features of advantage and various novel structural characteristics of my invention will appear as this description progresses.

The preferred embodiment of my invention is shown in the accompanying drawings wherein similar characters of reference designate corresponding parts and wherein Figure 1 is a vertical section of my novel piston construction taken on line 1—1 of Figure 2, and showing the manner of applying the expanding means to expand the rings laterally and radially.

Figure 1:
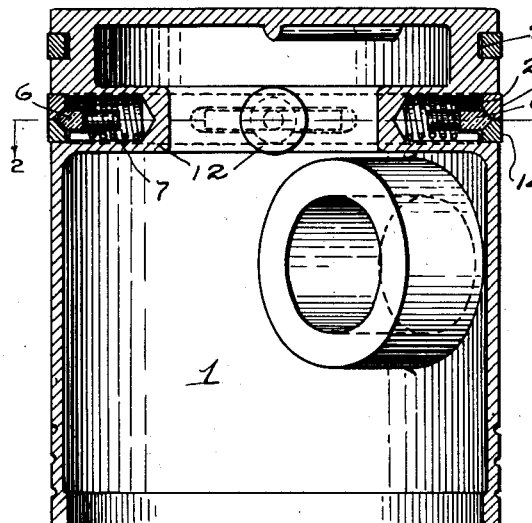
Figure 2:
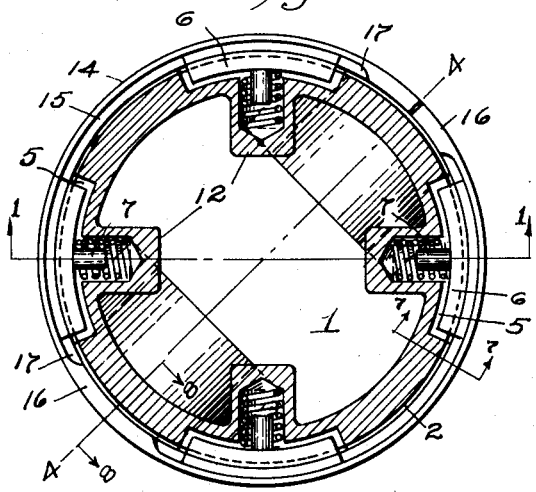
Figure 2 is a cross-section taken on line 2—2 of Figure 1, showing the expanding means positioned in the sockets in the groove and bearing against the chamfered edge of one ring.
Figure 5:
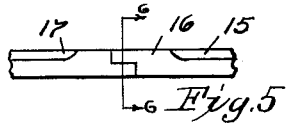
Figure 5 is a fragmentary inside elevation of the ring joint shown in Figure 4 and showing the manner of forming the rectangular section at the ring joint.
Figure 6:
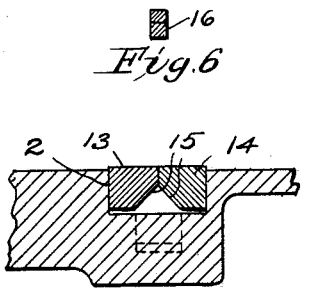
Figure 6 is a cross-section taken on line 6—6 of Figure 4.

In the drawings and with particular reference to Figures 1 and 2, the main body of my piston structure may be designated 1. The groove embodying part of my invention is shown at 2 and a standard groove and ring is shown at 3. The piston body as shown is of standard form and it will be obvious that it may take various forms.

Preferably diametrically disposed around the circumference of the groove 2 and symmetrical with the axis 4—4 of the wrist pin, are the sockets 5. The sockets 5 are designed to receive arcuate expanding members 6 which comprise a stem 7, a rectangular body portion 8 adapted to reciprocate within the socket 5 and a wedge-shaped surface or face 9.

Figure 7:
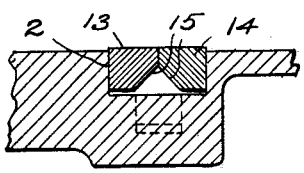
Figure 7 is a fragmentary sectional view taken on line 7—7 of Figure 2.
Figure 3:
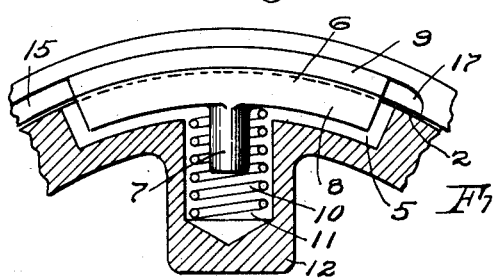
Figure 3 is an enlarged fragmentary view of one of the expanding members and relative parts for rendering it effective to expand and lock the ring.
Figure 8:
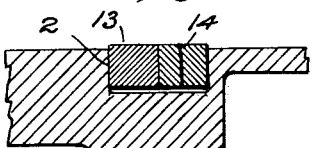
Figure 8 is a fragmentary sectional view taken on line 8—8 of Figure 2 and showing the relative position of the groove and the two rings at a point between two expanding members.

The stem 7 of the expanding members 6 are centered within coil springs 10 and these springs 10 are carried by suitable sockets 11 in the inwardly extending bosses 12 which are in alignment with the oppositely disposed expanding members 6. It will be obvious that, with this arrangement, springs of any size and resiliency may be used and that such springs are ideally adapted to withstand the heat, shock and wear to which the piston parts are subjected. The arcuate expanding members 6 also may be of any length, but I prefer that they shall be of a length substantially equal to the length of the space between such members. Thus, the shape of the groove 2 between the sockets 5 is of standard channel contour as best shown in Figures 2, 7 and 8.

Figure 4:
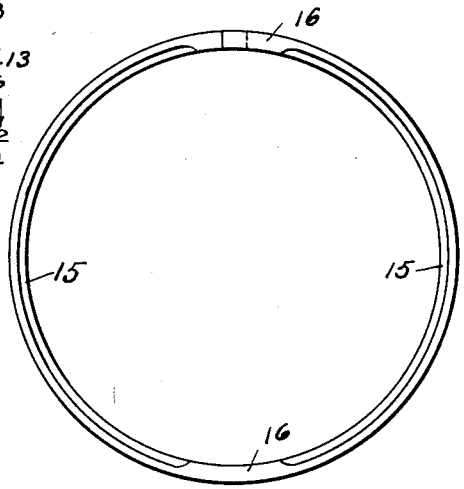
Figure 4 is a plan view of one of my novel rings showing the chamfered edge and the oppositely disposed rectangular sections.

Designed to be positioned within the groove 2 and to be resiliently supported by the wedge surface of the expanding members are the rings 13 and 14. These rings are, in general contour, similar to commercial snap rings but they differ materially in that they have a varying cross-section. As best shown in Figures 4 and 7, part of one of the inner edges of each ring is chamfered as at 15, while part of each ring, as shown in Figures 4 and 8, is of rectangular cross-section. As best shown in Figure 4, the joint portion of each ring and the part of the ring diametrically opposite the joint is rectangular in cross-section as shown at 16.

When the rings are positively positioned in the groove 2, the inner edges of the rings adjacent the faces 9 of the expanding members 6 will form a V-shaped slot to conform to this face 9 of the expanding members. The rectangular section 16 of the rings will be positioned between the sockets 5 as best shown in Figure 2, the solid rectangular section of one ring registering with the jointed rectangular section of the other ring. Thus, the arcuate members 6 will be effective to expand the ring, as will subsequently be described, and, at the same time, the ends of the members 6 will positively prevent the ring from turning in the groove 2 by contacting with the portion 17 of the ring where it merges from the chamfered to the rectangular section. The rectangular sections of the two rings are positively positioned within the groove 2 at points between the sockets 5, and as shown in Figure 8, are of such form as to completely fill the groove 2 and thus substantially prevent the passage of any fluid beneath the ring either transversely of the ring or circumferentially around the groove.

In the normal use of my piston structure, the spring 10 will constantly tend to force the members 6 outwardly. Due to the central positioning of the wedge-shaped head of the members 6 in the V-shaped groove formed by the rings, part of the radial force will be transmitted laterally to each of the rings and thus force the sides of the ring against the sides of the groove 2. The radial force of the members 6 will also be transmitted against the rings to cause them to be positively forced against the cylinder walls. As the expanding members 6 are equally spaced around the circumference of the groove 2, and the springs 10 of any predetermined tension, the pressure of the rings against the cylinder circumference and against the sides of the groove will be uniform, constant and positive. Also, since the ring joints are of rectangular cross-section and are held adjacent the solid rectangular cross-sections of the other ring, the rings will be locked and the groove at these points will always be filled by rings.

It will be understood that the rings 13 and 14 may be of rectangular cross-section so as to fill the groove at all points between the sockets 5 and it will also be understood that any number of sockets and expanding members 6 may be used consistent with obtaining the desired uniform pressure.

It will be apparent that I have provided an extremely simple and compact piston structure that will be effective to ensure a positive and uniform contact between the rings and the cylinder wall at all times to produce a tight packing with minimum friction, and which structure will also be simultaneously effective to insure a positive contact and sealing of the side of the rings and the sides of the ring groove.

It will also be obvious that my novel ring and groove structure is such that the oil or other fluids will be positively prevented from passing the ring at the joints and that the fluids will be substantially prevented from passing circumferentially in the groove beneath the rings.

Having thus described my invention, what I claim is:

1. Piston construction comprising a groove having parallel sides positioned in single planes, split rings for said groove having a portion of their adjacent surfaces chamfered and part of their length of rectangular cross-section, and means for maintaining the rectangular section of one ring opposite the joint of the other ring.

2. Piston construction comprising a ring groove, rings and single means cooperating only with the inner surface of said rings for forcing said rings against the sides of said groove and for preventing relative turning movement between said rings and said piston.

3. Piston construction comprising a ring groove having parallel sides positioned in single planes, split rings positioned adjacent to each other in said groove, said rings having a portion of their longitudinal surfaces chamfered and part of rectangular cross-section, and means cooperating with the chamfered surfaces of said rings for preventing relative turning movement between said rings and rings and piston.

4. Piston construction comprising a groove having parallel sides positioned in single planes at right angles to the axis of the piston, rings carried by said groove, one of said rings having part of its length of rectangular and part of chamfered cross-section, and means co-acting with said chamfered section for locking said rectangular section to register with the joint of the next adjacent ring.

5. Piston construction comprising a groove, split rings positioned in said groove, and single means for locking said rings in said groove and for applying pressure to said rings in a direction at right angles to the plane of the rings.

6. Piston construction comprising a groove, adjacent one piece split rings positioned in said groove in a single plane and one above the other longitudinally of the piston, one of the said rings having part of its length of rectangular cross-section and part of chamfered cross-section, and means cooperating with said chamfered portion for locking said rectangular section to register with the joint of the next adjacent ring without destroying any of the external bearing surface of the ring.

7. Piston construction comprising a groove, rings in said groove having a portion of their adjacent edges chamfered and a plurality of single means for expanding said rings radially and laterally against the sides of said groove and for locking said rings, said rings and said groove being so formed that a portion of the groove between said expanding and locking means will be substantially filled by said rings.

8. Piston construction comprising a groove, rings in said groove, single means spaced around the circumference of said groove for forcing each of said rings against the walls of the cylinder and against the sides of the groove, said means being adapted to contact with the said rings to lock said rings against movement longitudinally of the groove, portions of said rings and portions of said groove positioned between said means being formed to substantially prevent the passage of fluid beneath the rings at such points.

9. Piston construction comprising a groove, a pair of rings in said groove and a spring pressed means contacting complementally with adjacent longitudinal surfaces of said rings for expanding said rings laterally against the sides of the groove and radially against the walls of the cylinder and for locking said rings against rotative movement relative to the cylinder.

10. Piston construction comprising a groove, split rings in said groove and spring pressed means for expanding said rings radially and axially of the piston, a portion of said rings and said groove being of irregular cross-section to accommodate said expanding means and a registering portion of said rings and groove being of regular cross-section to substantially prevent the passage of fluid beneath the rings at such point of regular contour.

In testimony whereof I hereby affix my signature.

FREDERICK A. LITTER.